United States Patent [19]

Kemper

[11] 4,001,077

[45] Jan. 4, 1977

[54] EVAPORATION ACCELERATOR

[76] Inventor: Orville Kemper, 455 Huntridgre, Moab, Utah 84532

[22] Filed: Feb. 27, 1976

[21] Appl. No.: 662,214

[52] U.S. Cl. .............................. 159/4 S; 239/221; 239/251; 239/293; 261/91; 261/120

[51] Int. Cl.² .................... B01D 1/16; F23D 11/04; B01D 47/16

[58] Field of Search ................. 239/8, 22, 23, 221, 239/177, 179, 251, 192, 214.3, 293, 214.7, 225; 259/44; 261/91, 120; 159/45

[56] References Cited

UNITED STATES PATENTS

| 873,131 | 12/1907 | Leiser | 159/6 R |
|---|---|---|---|
| 2,983,508 | 5/1961 | Modine | 261/120 |
| 3,235,877 | 2/1966 | Grob | 261/91 |
| 3,373,821 | 3/1968 | Sare | 261/91 |
| 3,462,132 | 8/1969 | Kaelin | 261/91 |
| 3,497,185 | 2/1970 | Dively | 261/91 |
| 3,595,537 | 7/1971 | Kaelin | 261/91 |
| 3,811,662 | 5/1974 | Kaelin | 261/91 |
| 3,846,517 | 11/1974 | Ross | 261/91 |
| 3,871,581 | 3/1975 | Dively | 261/91 |

FOREIGN PATENTS OR APPLICATIONS 66,089  5/1956  France ............................. 159/4 S
(Addition to No. 1,052,553)

*Primary Examiner*—Jack Sofer
*Attorney, Agent, or Firm*—Trask & Britt

[57] ABSTRACT

An evaporation accelerator has a base with a housing rotatably affixed thereto and float means adjustably affixed thereto to float the accelerator in an evaporatable fluid. Air-operated propulsion means which receives compressed air from air supply means is connected to the housing to rotate it. Support members are also secured to the housing and extend generally radially away from the housing. Scoop means are secured to the support members and have a first end positioned in the fluid and a second end positioned above the surface of the fluid so that as the housing rotates fluid is scooped up and ejected over the surface of the fluid.

12 Claims, 6 Drawing Figures

EVAPORATION ACCELERATOR

STATE OF THE ART

1. Field

This invention relates to fluid evaporation devices. Specifically this invention provides a device and method to accelerate the evaporation of fluids.

2. State of the Art

Many well-known mineral recovery processes rely on evaporation of water from a brine solution held in an (e.g., solar) evaporation pond which may be several acres in area. On occasion, weather conditions occur over short and sometimes extended periods which are not conducive to evaporation. As a result, the recovery processes are inhibited or delayed; and the production of the desired minerals is in turn reduced or delayed. This has an adverse impact in the efficiency of the process and the efficiency of the business venture relying on the process.

Some devices are known which may be placed in a brine pond to mechanically agitate the brine to increase the evaporation and evaporation rate. However, such devices are ineffective and costly because they operate in such a manner that solid residue builds up rapidly on exposed surfaces and/or clogs internal parts.

Other devices are known which could be adapted for use in an evaporation pond. For example, see: U.S. Letters Pat. No. 3,811,662 (Kaelin); U.S. Letters Pat. No. 3,235,877 (Grob); and U.S. Letters Pat. No. 3,497,185 (Dively). However, such devices are too costly and too mechanically complex. The residue that would build up on parts and components would cause mechanical failure and/or cause the device to become too heavy and sink sufficiently into the fluid to become ineffective. Further, some of the devices do not float to take into account the lowering depth of brine as water evaporates.

It may also be noted that many of such devices are powered by electrical motors. Electrical motors are readily damaged in a brine environment due to corrosion, shorts and mechanical clogging. Accordingly, electrically powered devices are prone to high maintenance costs.

SUMMARY OF THE INVENTION

The present invention provides for an evaporation accelerator for accelerating the evaporation of an evaporatable fluid. The accelerator is comprised of float means connected to a base. Air-operated propulsion means is secured to a housing rotatably mounted to the base. The propulsion means receives compressed air from the air supply means and rotates the housing. Support members are also secured to the housing to extend radially therefrom. Scoop means are affixed to the distal ends of the support members generally perpendicularly thereto. The scoop means have a first end positioned into the fluid and a second end positioned above the surface of the fluid. As the housing and in turn the scoop means are rotated by the propulsion means, fluid is scooped up by the scoops and ejected over the surface of the fluid at the second end.

In one embodiment, the air-operated propulsion means is comprised of arms symmetrically positioned about and secured to the housing. A nozzle is affixed to each arm to extend substantially normally therefrom. All the nozzles are pointed to exhaust in the same direction. The arms have channels formed therein in communication with the air supply means to receive and supply compressed air. The air supply means may be a channel formed in the housing to extend through the base to connect to a coupling for connection to an external source of compressed air. The channel may be a cupped hollow axle with aperture means positioned between seals to supply the air to a chamber formed in the housing. The float means may be comprised of support legs which are adjustably secured to the base and which extend generally radially therefrom. The floats are secured to the distal ends of the support legs, are dimensioned and have a preselected buoyancy and are sized to be substantially entirely immersed in the fluid. The support members may also be symmetrically positioned about the housing. The scoop means may be positioned at an angle from about 15° to about 60° from the horizontal. The nozzles may also be positioned to exhaust air proximate the second end of the scoops.

In other embodiments the scoops may be cylindrically shaped tubes or semi-circular in section with a raised outside edge and a lip. In a preferred embodiment, there are three support legs, two support members and two arms with nozzles. The compressed air may be from about 50 psi to about 100 psi.

BRIEF DESCRIPTION OF THE DRAWINGS

In the drawings, which illustrate the best mode presently contemplated for carrying out the invention.

DESCRIPTION OF THE ILLUSTRATED EMBODIMENT

Figure 1:
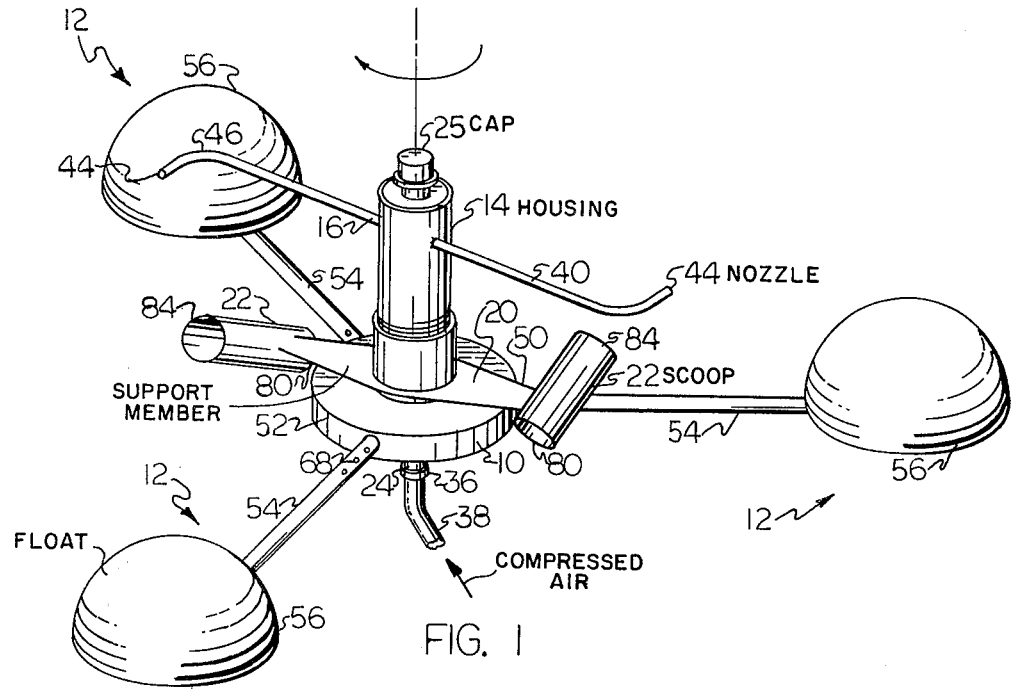
FIG. 1 is a perspective view of an evaporation accelerator of the invention.

FIG. 1 depicts an evaporation accelerator of the invention. It is comprised of a base 10, float means 12, a housing 14, air-operated propulsion means 16, air supply means 18, support members 20 and scoop means 22. The air-operated propulsion means 16 rotates the housing 14 and in turn the scoops 22. As the scoops 22 rotate, fluid is scooped up and ejected over the surface of the fluid as more fully discussed hereinafter.

The base 10 as illustrated is made of any substantially non-corrodible substance and formed to be positively buoyant. It may, for example, be made of wood. It may also be formed as a hollow sealed cylinder from any convenient material as set forth above. The buoyancy is selected in combination with the buoyancy of the float means to provide the evaporator accelerator with an overall positive buoyancy to position the scoop means as hereinafter described.

Figure 2:
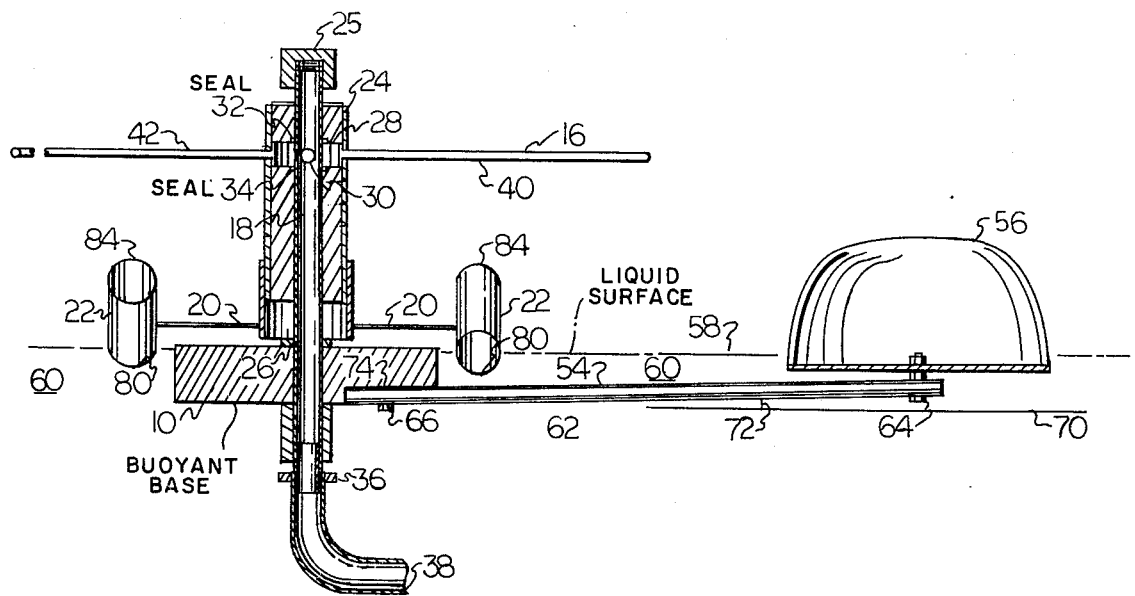
FIG. 2 is a partial cross-sectional view of an evaporation accelerator of the invention.

The housing 14, as best seen in FIG. 2, is solid and is rotatably mounted to the base 10. A hollow axle 25 is secured to and extends from the base 10 in a general vertical direction. A bearing surface 26 is provided to support the housing 14 and provide for minimal friction to enhance the rotatability of the housing 14. Air supply means 18 are formed in the housing 14. The air supply means 18 as depicted includes a chamber 28 formed in the housing 14 surrounding a plurality of apertures 30 formed in the axle 24. Upper and lower seals 32, 34 are positioned proximate the chamber to prevent leakage of air along the axle 24 which has a cap 25 at its upper end. The hollow axle 24, which constitutes channel means, extends through the base 10 to a coupling 36. An external source of compressed air (not shown) is connected to the coupling by a hose 38 to supply compressed air from about 50 pounds per square inch (PSI) to about 100 pounds per square inch (PSI) through the hollow axle 24 and the apertures 32 to the chamber 28 and in turn to the air-operated propulsion means 16.

As best seen in FIGS. 1 and 2, the air-operated propulsion means 16 illustrated is comprised of systematically positioned arms 40 which are secured to the housing 14 and extend generally radially therefrom. The arms have channels 42 formed therein in communication with the chamber 28 to receive and supply compressed air to nozzles 44 (i.e., air jets). The nozzles 44 are positioned substantially normally to the arms 40 and all point in the same direction. That is, the nozzles 44 are directed to exhaust air, and in turn develop a thrust in the opposite direction namely clockwise as indicated in FIG. 1 by the rotary arrow. The thrust developed at the nozzles 44 results in a torque which in turn causes the housing 14 to rotate.

As illustrated, the arms 40 and channel 42 are unitarily formed from conventional tubing with the nozzles 44 being the distal end of the tubing. It should be noted that with such construction the nozzles 44 are preferably connected to the arms 40 by an arcuate section of tubing 46 to minimize air turbulence in the tubing.

The support means 20, as best illustrated in FIG. 1, are flanges secured to the housing 20. The flanges 20 extend radially away from the housing 14 generally in a horizontal plane. The flanges 20 are dimensioned in length so that the scoop means 22 affixed to their distal ends 50, when rotating, circle proximate the outer perimeter 52 of the preferably cylindrically shaped base 10. The scoop means 22 are secured to the flanges 20 generally perpendicularly thereto to extend substantially tangentially with respect to the housing 14.

The float means 12 as shown is preferably comprised of support legs 54 and floats 56. The support legs 54 are elongated rods sized in length to provide for the stability of the accelerator when weather conditions produce waves on the surface 58 of the fluid 60. Preferably the legs 54 are from about 12 inches to about 24 inches in length 62, and are fabricated from any convenient, rigidly strong, non-corrodible plastic, wood, stainless steel or a plated metal. The floats 56 are also made of any convenient non-corrodible material. Preferably they are made of a lightweight rubber-like material in a hemispherical shape. However, it is recognized that any convenient geometric shape (for example, cylindrical of shallow depth and large diameter) which allows for the required buoyancy with minimal to no exposure of the float 56 above the surface 58 may be equally acceptable. The float 56 is secured to the distal end 64 of the leg 54.

The leg 54 is secured to the base 10. As best seen in FIG. 2, the leg 54 is secured by securing means which is a pair of screws 66 which are screwed through apertures 68 (FIG. 1) formed along the length 62 of the legs 54. The length of the legs 54 can thus be adjusted by positioning the desired apertures 68 with respect to base 10 in a well known manner. The legs 54 may also be angularly adjusted in relationship to the horizontal 70. That is, the angle 72 between the leg 54 and horizontal 70 can be adjusted by inserting shims between the leg 54 and the bottom 74 of the base 10 to which the leg 54 is secured by the screws 66.

It may be noted that length and angular adjustments of the legs 54 and floats 56 may be required to position the floats 56 with minimum exposure at or above the surface 58 of the fluid 60. That is, the legs 54 may be slightly flexible allowing the buoyant force developed by the float 56 to bend the leg 54 upward. Thus the float may become exposed above the fluid surface 58. When the fluid 60 is such that a residue will remain upon evaporation, residue can build up (plate out) on the floats 56 which will cause the accelerator to gain weight and sink lower into the fluid 60. It is desirable to avoid such a build-up. By adjusting the length 62 and the angle 72 of the legs 54, the floats 56 can be positioned to be preferably entirely submerged in the fluid 60.

As hereinbefore noted, the base 10 may be positively buoyant. When the base 10 is buoyant, the buoyancy of the floats 56 is preselected in combination with the buoyancy of the base 10 so that the scoops are positioned to scoop fluid 60 as hereinafter described and so that the floats are substantially submerged in the fluid 60 as hereinbefore described.

Figure 3:
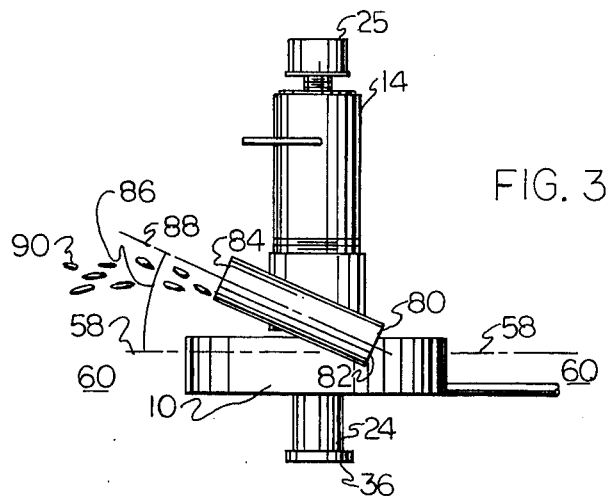
FIG. 3 is a partial side view of an evaporation accelerator of the invention.

The scoop means 22, as illustrated in FIGS. 1 through 3, is a cylindrically shaped tube. It has a first end 80 which is positioned in the fluid 60. It is preferred that the first end 80 not be entirely submerged in the fluid 80; rather the first end 80 is preferably positioned with its lowest portion 82 (FIG. 3) about ¼ of an inch to about ½ of an inch below the surface 58 of the fluid 60 to minimize fluid hydraulic drag and in turn the torque or power required to spin the housing 14. The scoop means 22 also has a second end 84 positioned above the surface 58 of the fluid 60. The scoop means 22 is secured to the support member 20 to have an angular relationship to the horizontal. That is, the scoop means 22 is positioned to form an angle 86 from about 15 to about 60° between the center line 88 of the scoop means 22 and the horizontal (fluid surface 58). An angle 86 of about 30° has been found to be highly preferred. The direction of rotation of the housing 14 is selected so that it rotates, fluid 60 is scooped up at the first end 80. The fluid 60 passes through the scoop means 22 to the second end 84 as the scoop means 22 rotate. The fluid 60 exits the scoop means 22 at the second end 84 above the fluid surface 58 and is scattered into droplets 90 which fall back to the surface 58. In the process of being converted into droplets 90 and falling, a portion of the fluid 60 is exposed to the atmosphere which would not otherwise be so exposed to accelerate evaporation. At the same time, movement of the scoop means 22 and the falling droplets 58 create surface motion of the fluid 60 (i.e., waves) to expose yet more fluid 60 to the atmosphere to accelerate evaporation. More air becomes dissolved in the fluid 60 near the surface 58 to further enhance evaporation for selected fluids.

Figure 4:
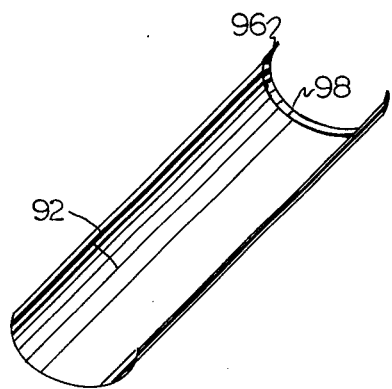
FIG. 4 is a perspective view of a scoop for use with an evaporation accelerator of the invention.
Figure 5:
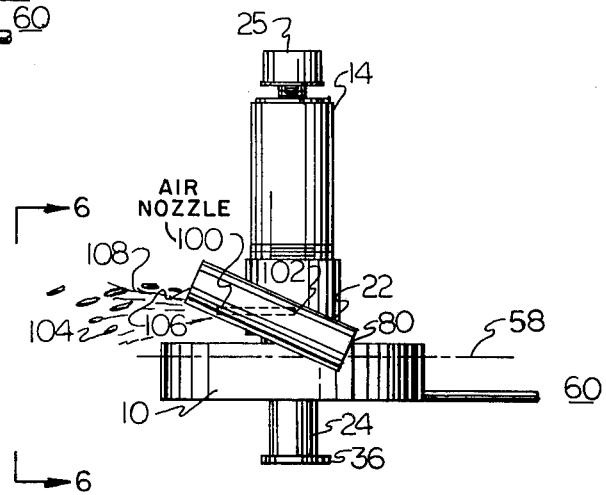
FIG. 5 is a partial side view of an evaporation accelerator of the invention.
Figure 6:
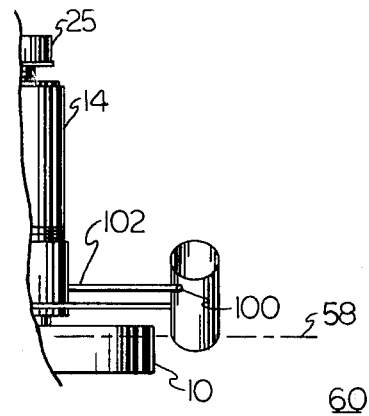
FIG. 6 is a partial side view of the evaporation accelerator of FIG. 5.

As hereinbefore noted, the scoop means 22 illustrated in FIGS. 1 through 3 are cylinders. Other geometric shapes are equally acceptable. For example, the scoop may be rectilinear in section. It may also be semicircular in section as shown in FIG. 4. Of any shape selected, it is highly preferred that the surface 92 interconnecting the first end 94 and the second end 96 (FIGS. 1–3, 80 and 84) be such as to provide an essentially straight and uninhibited path to facilitate easy flow of the fluid 60 from the first end 80, 94 to the second end 84, 96. In some instances, it may be desired to adapt means at the second end 96 (84) to increase the number of droplets 90 formed and/or increase the average loft or height of the droplets 90. In FIG. 4, a lip 98 is adapted to the second end 96 to increase loft and thus the time droplets 90 are exposed to the atmosphere. Increasing the time of exposure and the surface area of exposure by making more droplets 90 of smaller dimension further enhances evaporation.

It may be noted that the centrifugal force exerted upon the fluid 60 as it passes through the scoop means 22 and exits therefrom causes the droplets to be thrown radially outward and away from the base 10. It is thus important to have the floats 56 substantially submerged. Otherwise droplets 90 would fall thereon and evaporate leaving a residue which would build up and increase the overall weight of the accelerator. As a result, the accelerator would tend to sink in proportion to the weight build-up. The speed and the operability of the accelerator would be adversely affected thereby.

Referring now to FIGS. 5 and 6, an accelerator of the invention is depicted wherein the air discharge nozzles 100 at the end of the arms 102 are positioned to exhaust directly into the droplets 104 exiting the second end 106 of the scoop means 22. Such an arrangement is highly preferred because the exhausting compressed air 108 tends to enhance the breaking up of the fluid 60 exiting the scoop means 22 into droplets 104. That is, the force of the air 108 tends to break the droplets 104 into yet smaller droplets. At the same time, the exhausting air 100 exposes the droplets 104 to a greater quantity of air before the droplets 104 fall to the surface 58. Evaporation is thereby enhanced.

It may be noted that the accelerator as herein described and depicted in the illustrations has symmetrical pairs of arms 40 and support members 20 with scoop means 22. The scoops 22 are all preferably oriented to scoop up fluid and elevate it to the second end 84, 96 of the scoop means 22 as the housing 14 rotates. However, a greater plurality of arms 40 and support members 20 with scoop means 22 may be used if desired.

It may also be noted that the description and illustrations herein set forth are merely illustrative of the principles of the inventions. Those skilled in the art will recognize that other embodiments may readily be devised incorporating the principles of the inventions set forth in the claims.

I claim:

1. An evaporation accelerator comprising:

a base;

float means connected to said base to float said evaporation accelerator in an evaporatable liquid;

a housing rotatably secured to said base to extend upward therefrom;

air operated propulsion means connected to said housing to rotate said housing;

air supply means connected to supply compressed air to said propulsion means;

support members secured to said housing to extend generally radially therefrom;

scoop means secured to the free outer ends of said support members generally perpendicularly thereto, said scoop means being angularly positioned with respect to the horizontal to have a first depressed end positioned into said liquid and a second elevated end positioned above the surface of said float so that as said housing and in turn said scoop means are rotated by said propulsion means, fluid is scooped up by said scoop means at said first end and ejected over the surface of said fluid at said second end.

2. The evaporation accelerator of claim 1 wherein said air-operated propulsion means is comprised of arms secured to and symmetrically positioned around said housing to extend generally radially therefrom and a nozzle fixedly secured to each of said arms at their distal ends directed substantially normally thereto in a horizontal plane, each of said arms having channels formed therein in communication with said air supply means to receive and supply compressed air to its respective said nozzle, each of said nozzles receiving and exhausting said compressed air in substantially the same direction to develop a thrust to rotate said housing.

3. The evaporation accelerator of claim 2 wherein said air supply means is comprised of channel means formed in said housing in communication with said channels formed in said arms, said channel means extending through said base to coupling means which connects said accelerator to an external source of compressed air.

4. The evaporation accelerator of claim 3 wherein said channel means formed in said housing is a hollow axle about which said housing rotates, wherein said axle has aperture means formed therein between seal means positioned along said axle, wherein said axle is secured to and extends through said base with said coupling means secured thereto and with a cap adapted thereto at the end of said axle opposite said coupling means, and wherein a chamber is formed in said housing in communication with said aperture means and with said channels of said arms.

5. The evaporation accelerator of claim 4 wherein said float means is comprised of a plurality of support legs secured to said base to extend substantially radially therefrom, and a float secured to each of said legs, said floats having a volume such as to provide a preselected buoyancy and to be substantially entirely submerged in said fluid and each of said legs being adjustable in length and in angular relationship to the horizontal.

6. The evaporation accelerator of claim 5 wherein said support members are symmetrically positioned around said housing, wherein said scoop means have a center line and wherein said scoop means are positioned to have an angle from about 15° to about 60° as measured from horizontal to said center line.

7. The evaporation accelerator of claim 6 which is comprised of two of said arms with said nozzles affixed thereto, two of said support members with said scoops affixed thereto and three of said float means.

8. The evaporation accelerator of claim 7 wherein said base has a positive buoyancy which in combination with said preselected buoyancy of said floats is preselected to position said first end of said scoop in said fluid a preselected distance into said fluid.

9. The evaporation accelerator of claim 8 wherein said fluid is a brine and wherein said compressed air is at a pressure from about 50 pounds per square inch (PSI) to about 100 pounds per square inch (PSI).

10. The evaporation accelerator of claim 9 wherein said scoop means is a cylindrically shaped tube.

11. The evaporation accelerator of claim 9 wherein said scoop means is substantially semi-circular in section with a lip along its second end.

12. The evaporation accelerator of claim 9 wherein said nozzles are positioned to exhaust air proximate said second end of said scoops.

* * * * *